US012078611B2

(12) United States Patent
Takahashi

(10) Patent No.: US 12,078,611 B2
(45) Date of Patent: Sep. 3, 2024

(54) GAS ANALYZING APPARATUS AND CONTROL METHOD

(71) Applicant: ATONARP INC., Tokyo (JP)

(72) Inventor: Naoki Takahashi, Tokyo (JP)

(73) Assignee: ATONARP INC., Tokyo (JP)

( * ) Notice: Subject to any disclaimer, the term of this patent is extended or adjusted under 35 U.S.C. 154(b) by 0 days.

(21) Appl. No.: 18/261,412

(22) PCT Filed: Jan. 25, 2022

(86) PCT No.: PCT/JP2022/002616
§ 371 (c)(1),
(2) Date: Jul. 13, 2023

(87) PCT Pub. No.: WO2022/163635
PCT Pub. Date: Aug. 4, 2022

(65) Prior Publication Data
US 2024/0068989 A1 Feb. 29, 2024

(30) Foreign Application Priority Data
Jan. 29, 2021 (JP) .................................. 2021-013409

(51) Int. Cl.
*H01J 49/00* (2006.01)
*G01N 27/623* (2021.01)
(Continued)

(52) U.S. Cl.
CPC ........ *G01N 27/623* (2021.01); *H01J 49/0422* (2013.01); *H01J 49/105* (2013.01); *H01J 49/421* (2013.01); *H01J 49/429* (2013.01)

(58) Field of Classification Search
CPC .. G01N 27/623; H01J 49/0422; H01J 49/105; H01J 49/421; H01J 49/429
(Continued)

(56) References Cited

U.S. PATENT DOCUMENTS

| 5,481,107 A * | 1/1996 | Takada | H01J 49/061 |
| | | | 250/281 |
| 8,507,850 B2 * | 8/2013 | Whitehouse | H01J 49/063 |
| | | | 250/281 |

(Continued)

FOREIGN PATENT DOCUMENTS

| JP | H0785834 A | 3/1995 |
| JP | H087829 A | 1/1996 |

(Continued)

OTHER PUBLICATIONS

International Preliminary Report on Patentability (PCT/IPEA/409) with English translation dated Feb. 1, 2023, by the Japanese Patent Office as the International Searching Authority for International Application No. PCT/JP2022/002616.

(Continued)

*Primary Examiner* — Michael Maskell
(74) *Attorney, Agent, or Firm* — BUCHANAN INGERSOLL & ROONEY PC

(57) ABSTRACT

A gas analyzing apparatus includes: an ionization device that generates an ion flow of a sample gas; an analyzer that analyzes the ion flow supplied from the ionization device; a first ion path that non-linearly guides the ion flow from the ionization device to an inlet of the analyzer; and a blocking device for intermittently blocking and releasing, using an electric field or a magnetic field, the ion flow on at least part of a path of the ion flow through the first ion path to a mass filter of the analyzer. It is possible to perform measurement in a state where the ion flow is blocked and measurement in a state where the ion flow is not blocked.

11 Claims, 6 Drawing Sheets

(51) Int. Cl.
  *H01J 49/04*   (2006.01)
  *H01J 49/10*   (2006.01)
  *H01J 49/42*   (2006.01)
(58) Field of Classification Search
  USPC .......................................... 250/281, 282, 288
  See application file for complete search history.

(56) References Cited

U.S. PATENT DOCUMENTS

| 8,680,461 B2 * | 3/2014 | Rardin | H01J 49/0031 |
| | | | 250/281 |
| 8,921,803 B2 * | 12/2014 | Welkie | H01J 37/12 |
| | | | 250/288 |
| 9,570,281 B2 * | 2/2017 | Zhang | H01J 49/0072 |
| 10,593,535 B2 | 3/2020 | Tateishi | |
| 11,133,162 B2 * | 9/2021 | Makarov | H01J 49/0422 |
| 2003/0070913 A1 | 4/2003 | Miller et al. | |

FOREIGN PATENT DOCUMENTS

| JP | 2005512274 A | 4/2005 |
| JP | 2013130584 A | 7/2013 |
| JP | 6544491 B2 | 7/2019 |
| WO | 2019016851 A1 | 1/2019 |

OTHER PUBLICATIONS

International Search Report (PCT/ISA/210) with English translation and Written Opinion (PCT/ISA/237) mailed on Apr. 12, 2022, by the Japanese Patent Office as the International Searching Authority for International Application No. PCT/JP2022/002616.

* cited by examiner (a)

(b)

GAS ANALYZING APPARATUS AND CONTROL METHOD

TECHNICAL FIELD

The present invention relates to a gas analyzing apparatus and a control method for the same.

BACKGROUND ART

Japanese Laid-open Patent Publication No. 1996-7829 describes a technology that simplifies the configuration of an ion deflection lens in a plasma mass spectrometer apparatus and facilitates adjustment. To do so, a cylindrical intermediate electrode with an end surface that is obliquely cut is provided between first and second electrode plates that are provided substantially perpendicular to the direction of ion emission from a nozzle, and DC voltages are applied across the respective electrodes. Both electric fields are inclined, so that ions are deflected by both electric fields. On the other hand, since plasma light travels in a straight line, it is blocked by the second electrode plate.

SUMMARY OF INVENTION

There is demand for providing a software such as a control method or a measurement method and its hardware that is capable of reducing noise at an analyzing apparatus, which ionizes a sample gas and detects components contained in the sample gas, so as to provide a detection result with reduced noise.

One aspect of the present invention is a gas analyzing apparatus including: an ionization device that generates an ion flow of a sample gas; an analyzer that continuously or intermittently analyzes the ion flow supplied from the ionization device; a first ion path that non-linearly guides the ion flow from the ionization device to an inlet of the analyzer; and a blocking device that intermittently blocks and releases, using an electric field or a magnetic field, the ion flow on at least part of a path of the ion flow that flows through the first ion path to a mass filter of the analyzer, wherein the gas analyzing apparatus is capable of measurement in a state where the ion flow is blocked and a state where the ion flow is not blocked. The ionization device may include a device that plasma-ionizes the sample gas, and the blocking device may include at least one of a blocking potential generator and an energy filter.

In this gas analyzing apparatus, it is possible to use the control method described below, which enables highly accurate measurement where the influence of light from the ionization device and the influence of other noise are suppressed. The control method includes the following steps.
1. Acquiring first detection data using the analyzer in a state where passage of the ion flow is blocked by the blocking device.
2. Acquiring second detection data using the analyzer in a state where the passage of the ion flow is not blocked by the blocking apparatus, that is, where passage of the ion flow has been released or the blocking of the passage of the ion flow by the blocking device has been released.
3. Outputting a detection result including a difference between the second detection data and the first detection data. The first detection data and the second detection data may include spectrum data.

Although light generated during ionization travels in a straight line, the first path guides the ion flow non-linearly (that is, so as to bend), which can suppress the influence of light that produces noise at the analyzer and thereby improve the accuracy of analysis. However, on the first path, due to the need to guide the ion flow, it is impossible to completely block (shield) light, so that part of the light generated during ionization can reach the analyzer due to leakage or stray light and become a source of noise that affects the measurement results. In the present invention, instead of further enhancing the light shielding property (light shielding performance) to reduce the noise, or together with this, a background measurement result (first detection data) is obtained in a state where the ion flow is blocked (shielded), and by obtaining the difference with the second detection data for a state where the flow is not actively blocked, highly accurate measurement results in which the noise component is further reduced can be acquired.

The gas analyzing apparatus may further include a control device that controls the gas analyzing apparatus, and the control device may include: a first function that acquires first detection data using the analyzer in a state where passage of the ion flow is blocked by the blocking device; a second function that acquires second detection data using the analyzer in a state where the passage of the ion flow has been released by the blocking device; and a third function that outputs a detection result including a difference between the second detection data and the first detection data.

The control device is typically an apparatus that executes a control program including instructions that execute acquiring of first detection data using the analyzer in a state where passage of the ion flow is blocked by the blocking device, acquiring of second detection data using the analyzer in a state where the passage of the ion flow has been released by the blocking device, and outputting a detection result including a difference between the second detection data and the first detection data.

BRIEF DESCRIPTION OF DRAWINGS

FIG. 1(a) depicts the front right and FIG. 1(b) depicts the front left.

DESCRIPTION OF EMBODIMENTS

Figure 1:
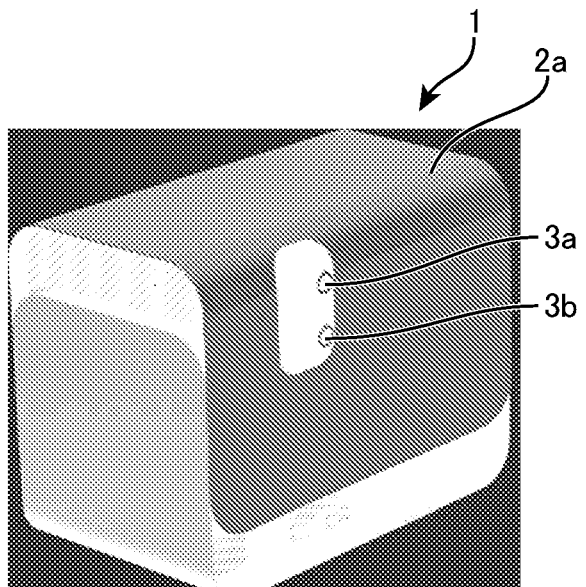
FIG. 1 is a perspective view depicting the appearance of one example of a gas analyzing apparatus, where
Figure 1:
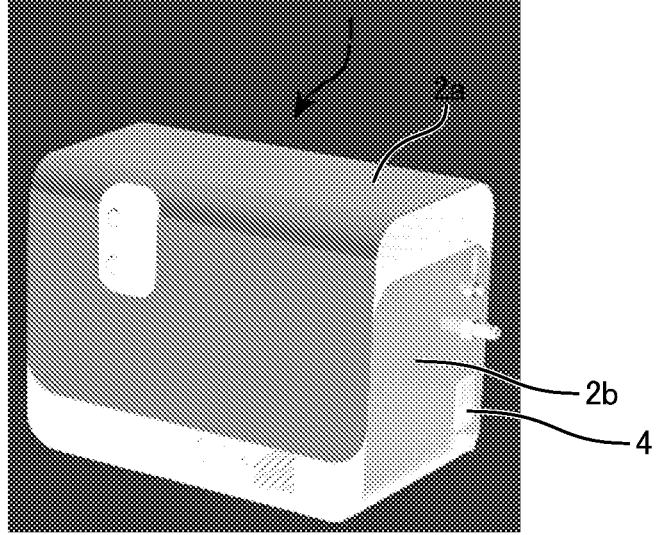

FIGS. 1(a) and 1(b) depict the external appearance of a gas analyzing apparatus (gas analysis device, gas analyzer apparatus) when viewed from the front right and front left. The gas analyzing apparatus 1 is a hybrid type that includes a microplasma generator and an electron impact (EI) ion source as ionization devices (ion sources). One example of the size and weight of the gas analyzing apparatus 1 is 400 mm in length, 297 mm in width, 341 mm in height, and 15 kg in weight, with the gas analyzing apparatus 1 operating on a power supply of 24 VDC (350 W). The gas analyzing apparatus 1 includes a sample inlet 3a for generation of plasma, a sample inlet 3b for EI ionization, and several ports 4 for data input/output on a side surface.

Figure 2:
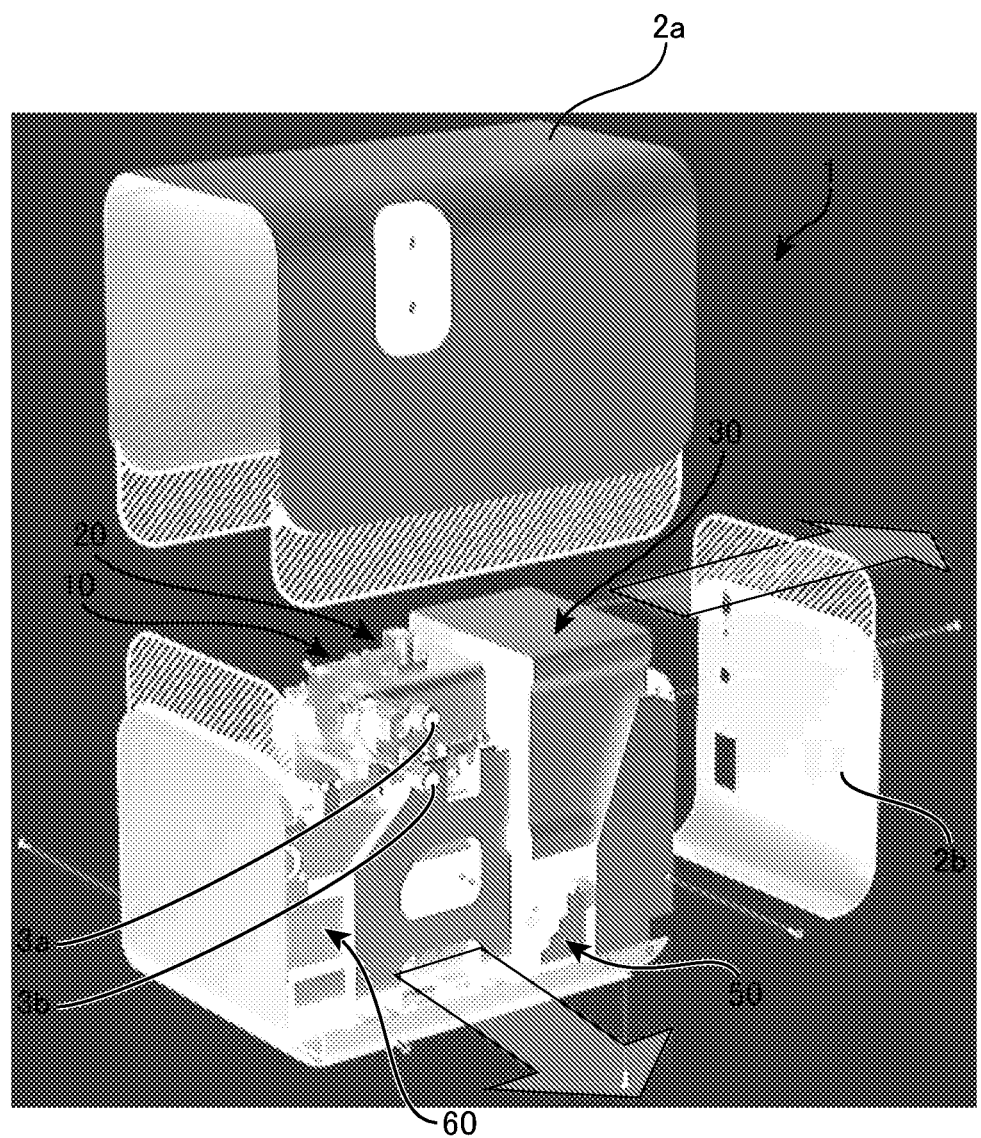
FIG. 2 is a perspective view depicting the overall internal configuration of the gas analyzing apparatus when a housing has been opened.

FIG. 2 depicts a state where the upper housing 2a and the side panel 2b of the gas analyzing apparatus 1 have been removed. The gas analyzing apparatus 1 includes an ionization unit (ionization device, ion generator) 10 that ionizes a sample gas (sampling gas or gas sample) to be measured that has been supplied from a process being monitored, an analyzer unit (analyzer) 20 for analyzing the sample gas via the generated ions (ion flow), a control module 30 for the analyzer 20, a system controller (programmable logic controller (PLC)) 50 for controlling the gas analyzing apparatus 1 and outputting measurement data, and an exhaust system 60.

Figure 3:
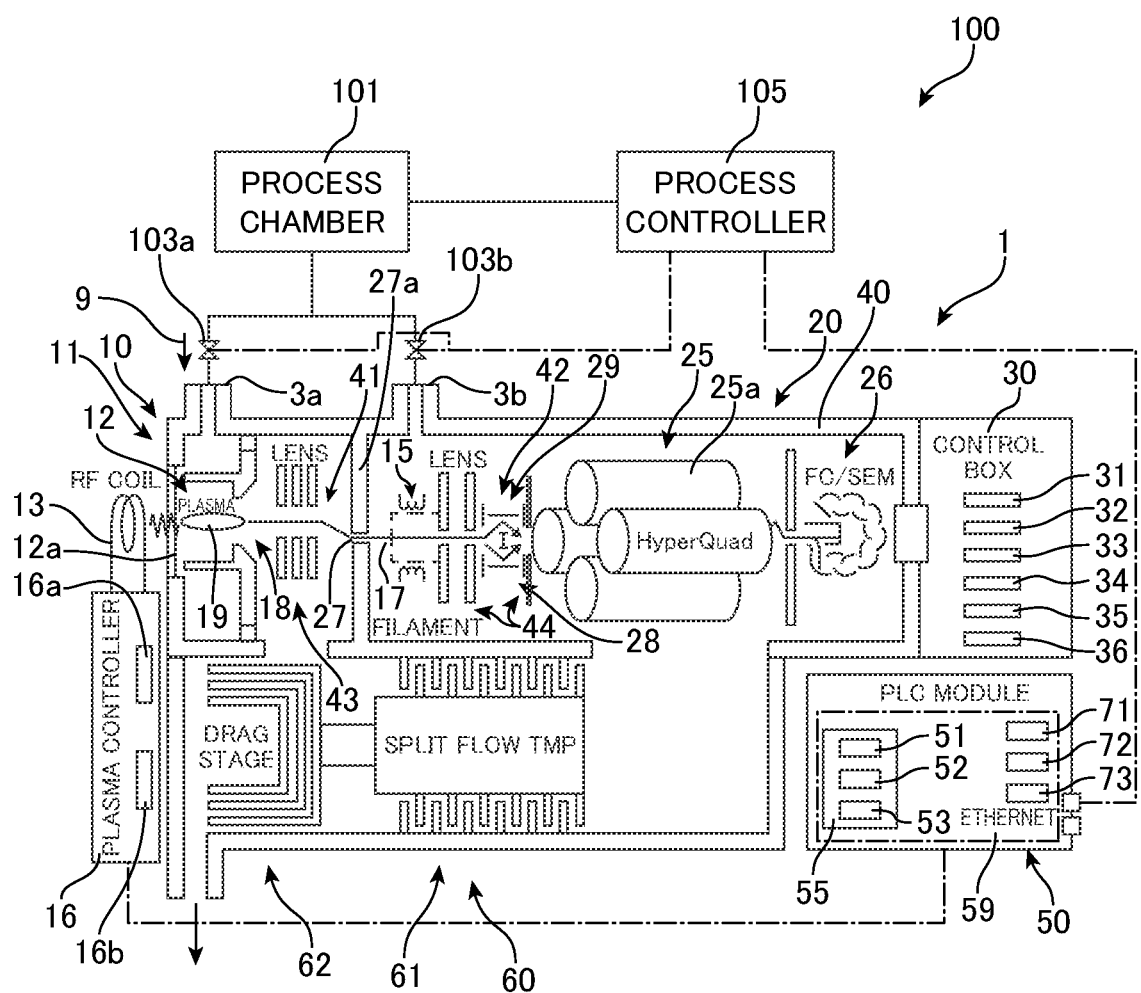
FIG. 3 is a block diagram depicting the overall configuration of the gas analyzing apparatus.

FIG. 3 depicts the schematic configuration of a process monitor 100 as an example of a system including the gas analyzing apparatus 1. A gas analyzing apparatus 1 analyzes sample gas 9 supplied from a process chamber 101 in which a plasma process being monitored is performed. The plasma process performed in the process chamber 101 is typically a process for forming various types of films or layers on a substrate or a process for etching a substrate, and includes CVD (Chemical Vapor Deposition) or PVD (Physical Vapor Deposition). The plasma process may be a process of laminating various types of thin film on an optical component, such as a lens, a filter, or the like, as a substrate.

As one example, in the field of semiconductors, semiconductor chip structures have become increasingly three-dimensional in recent years due to demands for increased memory capacity, improvements in logic speed, and reduced power consumption. This means that for semiconductor process control, there have been the problems of processes becoming more complex, an increased demand for atom-level quality, and an increase in the cost of measurement monitoring. Monitoring of gas including reactants and by-products is important for process matching, for measurement of transition points during deposition, and for detection of endpoints during etching. With optical emission spectroscopy (OES) which is presently in standard use, it is difficult to comprehensively monitor processes. On the other hand, residual gas analyzers and mass spectrometers with an ion source using a regular hot filament face a problem of reduced lifetime due to damage caused by semiconductor gases.

In the process monitor system 100 which uses the gas analyzing apparatus 1 according to the present embodiment, it is possible to provide innovative process control by performing real-time monitoring, even in a harsh environment and providing highly reliable measurement results. The gas analyzing apparatus 1 functions as a total solution platform developed for the purpose of dramatically improving the throughput in semiconductor chip manufacturing and maximizing the yield rate. As described above, the gas analyzing apparatus 1 according to the present embodiment has an extremely small installed footprint, and can therefore be directly connected to the chamber 101 and used on site. In addition, the standard protocols that are currently in mainstream use in semiconductor manufacturing process equipment, such as EtherCAT protocol, can be implemented in the PLC 50 and integrated into the process equipment control system 100.

The gas analyzing apparatus 1 includes an ionization device (ionization apparatus) 10 that generates ions (an ion flow) 17 of the sample gas 9 and an analyzer (analyzer unit) 20 that analyzes the ions 17 supplied from the ionization apparatus 10. The ionization device 10 includes a plasma generator (plasma generation device) 11 that generates plasma (microplasma) 19 of the sample gas 9, which is to be measured and is supplied via the sample input 3a from a process, and supplies the plasma as an ion flow 17 to the analyzer 20. The plasma generator 11 includes a dielectric wall structure 12a, a chamber (sample chamber) 12 into which the sample gas 9 to be measured flows, a high frequency supplying device (RF supplying mechanism) 13 for generating the plasma 19 in the sample chamber 12, which has been depressurized, using a high-frequency electric field and/or a magnetic field applied through the dielectric wall structure 12a, and a plasma controller 16 for controlling the frequency and power of the high frequency waves.

The gas analyzing apparatus 1 according to the present embodiment is a mass spectrometry-type analyzing (analysis) apparatus that is capable of analyzing the sample gas 9 supplied from a process 100 either continuously or intermittently with a short cycle. The analyzer 20 includes a filter unit (mass filter, in the present embodiment a quadrupole unit (quadrupole electrodes, quadrupole device) 25, which filters the flow (ion flow) 17 of an ionized sample gas (sample gas ions) based on mass-to-charge ratio, and a detector unit (detector) 26, which detects the filtered ions. The gas analyzing apparatus 1 further includes a vacuum vessel (housing) 40, which houses the filter unit 25 and the detector unit 26, and the exhaust system 60, which keeps the inside of the housing 40 in an appropriate negative pressure condition (vacuum condition). The exhaust system 60 according to the present embodiment includes a turbomolecular pump (TMP) 61 and a roots pump (drag stage) 62. The exhaust system 60 is a split-flow type that also controls the internal pressure of the sample chamber 12 of the plasma generator 11. One stage of the multi-stage TMP 61 and the input of the roots pump 62 of the exhaust system 60 that reaches a negative pressure that is suited to the internal pressure of the chamber 12 is connected to the chamber 12 so that the internal pressure of the chamber 12 is controlled.

The mass filter 25 in the present embodiment includes four cylindrical or columnar electrodes (a so-called "Hyper-Quad") 25a whose inner surfaces are hyperbolically formed to produce a hyperbolic electric field that filters according to mass-to-charge ratio. The quadrupole-type mass filter 25 may be a filter in which a large number of, as one example, nine, columnar electrodes are disposed to form a matrix (array) so as to produce a plurality of quasi-hyperbolic electric fields. The detector (detector unit) 26 includes a Faraday cap (FC) and a secondary electron multiplier (SEM), which can be used in combination or by switching between them. The detector 26 may be another type, such as a channel secondary electron multiplier (channel electron multiplier (CEM)) or a microchannel plate (MP).

The plasma generator (generation unit) 11 in the present embodiment includes the sample chamber 12 for generating plasma therein that is integrally incorporated inside the housing 40. An outer shell of the chamber 12 is made of Hastelloy and an insulated cylindrical electrode is inserted inside the chamber 12. The plasma 19 is generated inside this cylindrical electrode. Only the sample gas 9 from the process chamber 101 being monitored is allowed to flow via the sample input 3a into the depressurized sample chamber 12, so that the plasma (microplasma) 19 is formed inside the sample chamber 12. That is, in the plasma generator 11, the plasma 19 to be analyzed is generated from the sample gas 9 only without using an assist gas (support gas), such as argon gas. The wall 12a of the sample chamber 12 is made of a dielectric member (dielectric), examples of which include dielectrics that are high resistant to plasma, such as quartz, aluminum oxide ($Al_2O_3$) and silicon nitride ($SiN_3$).

The plasma generation apparatus (RF supplying mechanism) 13 of the plasma generator 11 generates the plasma 19 inside the sample chamber 12 using an electric field and/or a magnetic field applied through the dielectric wall structure 12a without using a plasma torch. One example of the RF supplying mechanism 13 is a mechanism that excites the plasma 19 with high frequency (radio frequency, RF) power. Example methods for the RF supplying mechanism 13 include inductively coupled plasma (ICP), dielectric barrier discharge (DBD), and electron cyclotron resonance (ECR). The RF supplying mechanism 13 for generating plasma using these methods may include a high-frequency power source and an RF field shaping unit. A typical RF field shaping unit includes coils disposed along the sample chamber 12.

The plasma controller 16 of the plasma generator 11 in the present embodiment includes a matching control unit (matching controller) 16a that adjusts (matches) the frequency of the RF field supplied by the RF supplying apparatus 13 to maintain the plasma and a function (ignition unit, ignitor) 16b that causes ignition by changing the RF frequency of the matching state. The ignition unit 16b is capable of igniting plasma using the RF supplying apparatus 13 by applying high-power high-frequency power in a pulse form for a short period of time, as one example, around 10 ms, at a higher frequency than the matching frequency for example. This means that plasma can be easily ignited without providing electrodes for conventional glow discharge or without providing a mechanism for applying high voltage stimulation, such as a piezoelectric element. After the plasma has been ignited, the plasma can be generated and maintained by shifting the RF supplying apparatus 13 to steady-state operation. Note that the plasma generator 11 may be a device type that forms inductively coupled plasma (ICP) using an assist gas, such as argon gas, and then introduces the sample gas to ionize the sample gas.

The internal pressure of the sample chamber 12 in the present embodiment is a pressure that facilitates the generation of plasma, and may be in a range of 0.01 to 1 kPa for example. When the internal pressure of the process chamber 101 is controlled to around 1 to several 100 Pa, the internal pressure of the sample chamber 12 may be controlled to a lower pressure, as one example, around 0.1 to several 10 Pa, or alternatively may be controlled to be 0.1 Pa or higher, 0.5 Pa or higher, 10 Pa or lower, or 5 Pa or lower. As one example, the inside of the sample chamber 12 may be depressurized to about 1 to 10 mTorr (0.13 to 1.3 Pa). By maintaining the sample chamber 12 in the depressurized state indicated above, it is possible to generate the plasma 19 at a low temperature using only the sample gas 9. The sample chamber 12 may be a small chamber (miniature chamber) of a size that is large enough to generate the microplasma 19, as one example, several millimeters to several tens of millimeters. By reducing the volume of the sample chamber 12, it is possible to provide the gas analyzing apparatus 1 that has superior real-time performance. The sample chamber 12 may be cylindrical.

The gas analyzing apparatus 1 includes a first ion path 41, which non-linearly guides the ion flow 17 from the plasma generator 11 of the ionization device 10 (typically the outlet 18 of the chamber 12) to the inlet 27 of the analyzer (analyzer unit) 20, and a second ion path 42, which guides the ion flow 17 from the inlet 27 of the analyzer 20 so as to enter the filter unit 25 at a predetermined angle, typically in parallel to the electrode 25a of the filter unit 25. The first ion path 41 includes a first electrostatic lens group 43, extracts the ion flow 17 from the plasma 19 that has been formed in the sample chamber (plasma chamber) 12 through a chamber outlet 18 using an electric field and directs the ion flow 17 to an inlet (opening) 27 located non-linearly (indirectly) with respect to the chamber outlet (chamber opening) 18, The inlet 27 of the analyzer unit 20 is an opening provided in a barrier 27a and ensures that only the ion flow 17 that has passed through the inlet (opening) 27 is introduced into the analyzer 20. In the present embodiment, the inlet 27 of the analyzer 20 is positioned relative to the chamber outlet 18 so that when looping from the second ion path 42 or relative to a central axis of the quadrupole filter 25, the inlet 27 and outlet 18 are shifted to an extent where their respective openings do not overlap. The first ion path 41 is provided between these openings 18 and 27 so as to guide the ion flow 17 on a path that bends (angles, curves, or flexes). On the other hand, any light leaking from the chamber outlet 18 is shielded from the analyzer 20 by the barrier 27a.

Although the path of the ion flow 17 bends or curves under the influence of the electric field, light, which is produced by excited luminescence of the plasma 19 and leaks from the chamber outlet 18, travels in a straight line without being affected by the electric field. For this reason, the opening 27 is provided to lead the ion flow 17 to the filter unit 25 at a position shifted with respect to the chamber outlet 18, and by providing the first ion path 41, which non-linearly guides (bends, curves) the ion flow 17 between the chamber outlet 18 and the opening 27, it is possible to suppress excitation light of the plasma that is emitted in a straight line from the chamber outlet 18 from reaching the inlet (opening) 27 of the analyzer 20. This means that it is possible to suppress the generation of secondary electrons, which would become a background signal (noise) in a mass spectrum, due to excitation light of the plasma reaching the detector 26, which in the present embodiment is a combination of a Faraday cup (FC) and a secondary electron multiplier (SEM).

It is sufficient for the first ion path 41 that non-linearly guides (bends, curves) the ion flow 17 to block light that travels in a straight line, and the first ion path 41 may guide the ion flow 17 so as to bend once, or may further bend the ion flow 17 so that the chamber outlet 18 and the inlet 27 of the analyzer unit 20 are aligned in straight line. In addition, it is sufficient for the first ion path 41 to control the direction of the ion flow 17, and the first ion path 41 does not need to have a precision or diameter that enables control of the direction of travel of individual ions. The first ion path 41 may be a path designed so that such control and/or filtering is not performed.

The second ion path 42 includes a second electrostatic lens group 44 and an energy filter 28 positioned within the second electrostatic lens group 44. The second electrostatic lens group 44 controls the direction of the ion flow 17 entering the second ion path 42 through the opening 27 of the barrier 27a provided between the first ion path 41 and the second electrostatic lens group 44. The energy filter 28 may be a Bessel Box, a CMA (Cylindrical Mirror Analyzer), or a CHA (Concentric Hemispherical Analyzer), The Bessel Box-type energy filter 28 is composed of a cylindrical electrode, a disc-shaped electrode (which is at the same potential as the cylindrical electrode) placed in the center of the cylindrical electrode, and electrodes disposed at both ends of the cylindrical electrode. Due to the electric field generated by the potential difference Vba between the cylindrical electrode and the two end electrodes and the potential Vbe of the cylindrical electrode, the energy filter 28 acts as a band-pass filter that allows only ions with a specific kinetic energy to pass through. In addition, soft X-rays generated during plasma generation and light generated during gas ionization can be prevented from directly entering the ion detector (detector) 26 by the disc-shaped electrode disposed in the center of the cylindrical electrode, which can reduce noise. In addition, the energy filter 28 is a structure that can eliminate ions and neutral particles that have been generated at an ion generating unit or outside and entered the filter unit 25 in parallel to the central axis, and can therefore suppress the detection of such ions.

By controlling the electric field, the energy filter 28 is also capable of blocking the passage of ions (an ion flow) 17 of all kinetic energies intended to enter the filter unit 25 through the second ion path 42. Accordingly, the energy filter 28 functions as a blocking device 29 that intermittently blocks and releases the ion flow 17 using an electric field or a magnetic field at least part of a path taken by the ion flow 17 through the first ion path 41 to the mass filter 25 of the analyzer 20. In place of or in conjunction with this energy filter 28, the electric field (potential) of part or all of the second electrostatic lens group 44, which controls the direction of the ion flow 17 on the second ion path 42, may be controlled and used as a blocking potential so as to function as a blocking device (blocking potential generator) 29 that intermittently blocks or releases the ion flow 17 that would reach the mass filter 25.

The ionization device 10 of the gas analyzing apparatus 1 according to the present embodiment further includes a filament (EI ion source) 15 that ionizes, through electron impact, the sample gas 9 to be measured that is supplied from a process via the sample input 3b. The EI ion source 15 operates in a high vacuum, and when the process in the process chamber 101 to be monitored makes it difficult to generate the microplasma 19 in a high vacuum, operates at the ultimate pressure of the gas analyzing apparatus 1. The EI ion source 15 can also be used for the purpose of sensitivity correction. The supplying of the sample gas 9 to the sample input 3a for plasma ionization and to the sample input 3b for EI ionization can be automatically switched by the process controller 105 using valves 103a and 103b provided upstream.

In one embodiment, the process controller 105 supplies the sample gas 9 to the gas analyzing apparatus 1 by opening the valve 103a in the case of a reactive process where the internal pressure of the process chamber 101 is high, as one example, 1 Pa or higher, generates the plasma 19 of the sample gas 9 via the control apparatus (PLC module) 50 of the gas analyzing apparatus 1, and draws the ion flow 17 which is subjected to mass spectrometry. When doing so, the EI ion source (filament) 15 is not lit, and the valve (port) 103b is closed. When the internal pressure of the process chamber 101 is low, for example, when measurement is performed at the ultimate pressure or the like, the process controller 105 closes the plasma-side port (valve) 103a and opens the EI-side port 103b to supply the sample gas 9, and the filament is lit (EI is activated) by the control apparatus 50 to generate the ion flow 17 which is subjected to mass spectrometry.

The gas analyzing apparatus 1 includes the control apparatus (unit controller, module controller, control box, or control module) 30 that controls each module of the analyzing unit 20 under the system controller (system control apparatus or PLC module) 50. The unit controller 30 includes: a first lens controller (control unit, control function, circuit, or module) 31 that controls the potential of the first electrostatic lens group 43; a second lens controller (control unit) 32 that controls the potential of the second electrostatic lens group 44; an energy filter controller (energy filter control unit) 33 that controls the potential of the energy filter 28; a filament controller (filament control unit) 34 that controls the filament current and voltage; a filter controller (quadrupole filter control unit) 35 that controls the RF and DC voltages of the mass filter 25; and a detector controller (detector control unit) 36 that controls the detector 26 and acquires the detection current (detection results). In the present embodiment, as one example, by setting the control conditions of the first electrostatic lens 43 and the second electrostatic lens 44 at the same as the conditions as when acquiring a mass spectrum by the analyzer 20 and passing the ion flow 17, it is possible to block or release the ion flow 17 that flows to the mass filter 25 of the analyzer unit 20 by merely changing the conditions of the energy filter 28.

The system controller (PLC module) 50 that controls the gas analyzing apparatus 1 includes computer resources such as a CPU and a memory 59, and controls the gas analyzing apparatus 1 by downloading and executing a program (control program, program product) 55. The program 55 includes instructions that cause the PLC module 50 to function as: a first module (first function, first controller module) 51 that performs processing (first processing) for acquiring first detection data 71 with the analyzer 20 in a state where the blocking device 29 blocks the passage of the ion flow 17; a second module (second function, second controller module) 52 that performs processing (second processing) for acquiring second detection data 72 with the analyzer 20 in a state where the blocking apparatus 29 does not block the passage of the ion flow 17 (that is, the passage of the ion flow 17 is released); and a third module (third function, third controller module) 53 that performs processing (third processing) that outputs a detection result 73 including the difference between the second detection data 72 and the first detection data 71.

Figure 4:
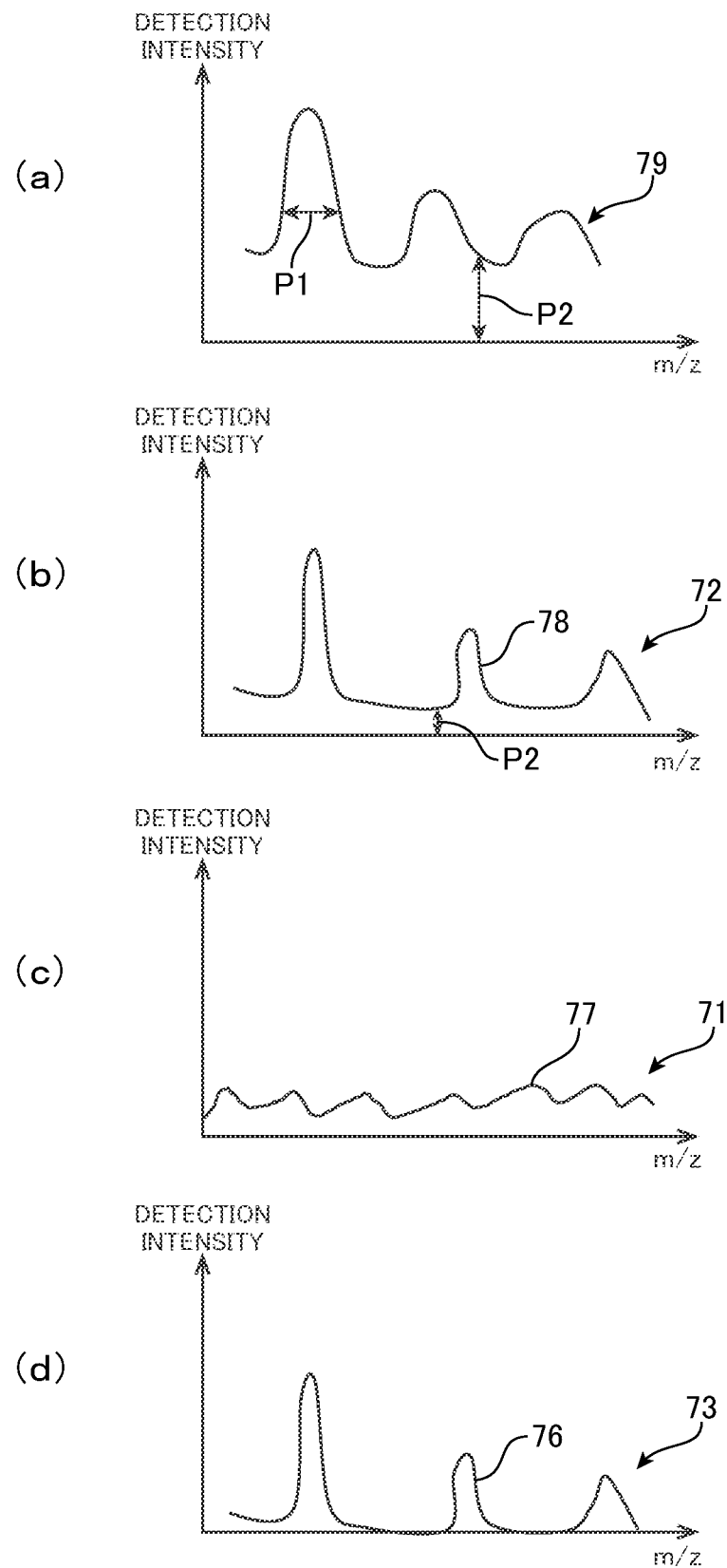
FIG. 4 is a diagram depicting several examples of data obtained by the gas analyzing apparatus.

FIG. 4 schematically depicts numerous examples of mass spectra (spectra data, or spectra). FIG. 4(a) depicts an example of detection results obtained not by the gas analyzing apparatus 1 according to the present embodiment but by a conventional mass spectrometer apparatus that does not have a first ion path that guides the ion flow 17 on a bent path. That is, FIG. 4(a) is an example of the mass spectrum 79 obtained by inputting the ion flow 17 into the analyzer 20 without shielding the light emitted by the plasma 19. It can be understood that the peak width P1 of the mass spectrum 79 is wide, the offset P2 is large, and noise caused by the light emitted by the plasma 19 reaching the detector 26 lowers the accuracy of the detected mass spectrum.

FIG. 4(b) is an example of a mass spectrum obtained as a detection result by the gas analyzing apparatus 1 according to the present embodiment. This mass spectrum 78 schematically depicts data (second measurement data) 72 measured in a state (released state) where passage of the ion flow 17 is not blocked by the blocking device 29. By guiding the ion flow 17 non-linearly on the first ion path 41 to the analyzer 20, it is possible to suppress the influence of the light emitted by the plasma 19 which travels in a straight line. For this reason, it can be understood that the peaks in the mass spectrum 78 are sharpened (that is, the widths narrow) and the offset (noise floor) P2 is reduced. In addition, in this gas analyzing apparatus 1, it is possible to select the energy of the ions 17 inputted into the mass filter 25 by the energy filter 28. This means it is possible to obtain a mass spectrum with sharper peaks.

FIG. 4(c) depicts a spectrum 77 obtained as a detection result by the gas analyzing apparatus 1 according to the present embodiment and schematically depicts data (the first detection data) 71 measured by the analyzer 20 in a state where the passage of the ion flow 17 is blocked by the blocking device 29. That is, the spectrum 77 is one example of a detection spectrum obtained by the detector 26 with the conditions of the energy filter 28 set to not pass ions of all energies and therefore function as the blocking device 29. On the first ion path 41 the ion flow 17 is non-linearly guided toward the opening 27. However, there are cases where it is not possible to select the deflection angle of the ion flow 17 and/or the area of the opening 27 with priority to shielding of light due to the need to supply a sufficient ion flow 17 to the analyzer unit 20 for measurement purposes, including ions of various mass-to-charge ratios (m/z) to be detected. In particular, when trying to realize a portable and compact gas analyzing apparatus 1, it may not be possible to set the ion flow 17 with a sufficient length and angle for shielding of light.

In addition, stray light almost always occurs inside the gas analyzing apparatus 1, and ions that are not filtered by the mass filter 25 may reach the detector 26. Accordingly, there is always the possibility that noise which is inherent to the gas analyzing apparatus 1 will occur, and it is difficult to block all of such noise with hardware. In the gas analyzing apparatus 1, measurement is performed with the first controller module (function) 51 of the PLC 50 blocking the ion flow 17 inputted as designed into the mass filter 25 with the blocking device 29. The data (first detection data) 71 obtained in this process can be used as inherent noise (that is, an offset) in the measurement conditions for the gas analyzing apparatus 1.

FIG. 4(d) depicts a mass spectrum 76 produced by the third controller module (function) 53 of the PLC 50 that is the difference between the second detection data 72 (see FIG. 4(b)) measured by the second controller module 52 in a state where the ion flow 17 is not blocked by the blocking device 29 and the first detection data 71 (see FIG. 4(c)) acquired by the first controller module 51 in a state where the ion flow 17 is blocked by the blocking device 29. By subtracting the inherent noise spectrum (background spectrum) 77 of the gas analyzing apparatus 1 obtained as the first detection data 71 from the mass spectrum 78 obtained as the second detection data 72, it is possible to obtain a highly accurate mass spectrum 76 in which the influence of noise including the offset is hardly observed, and to output this as the detection result 73.

Figure 5:
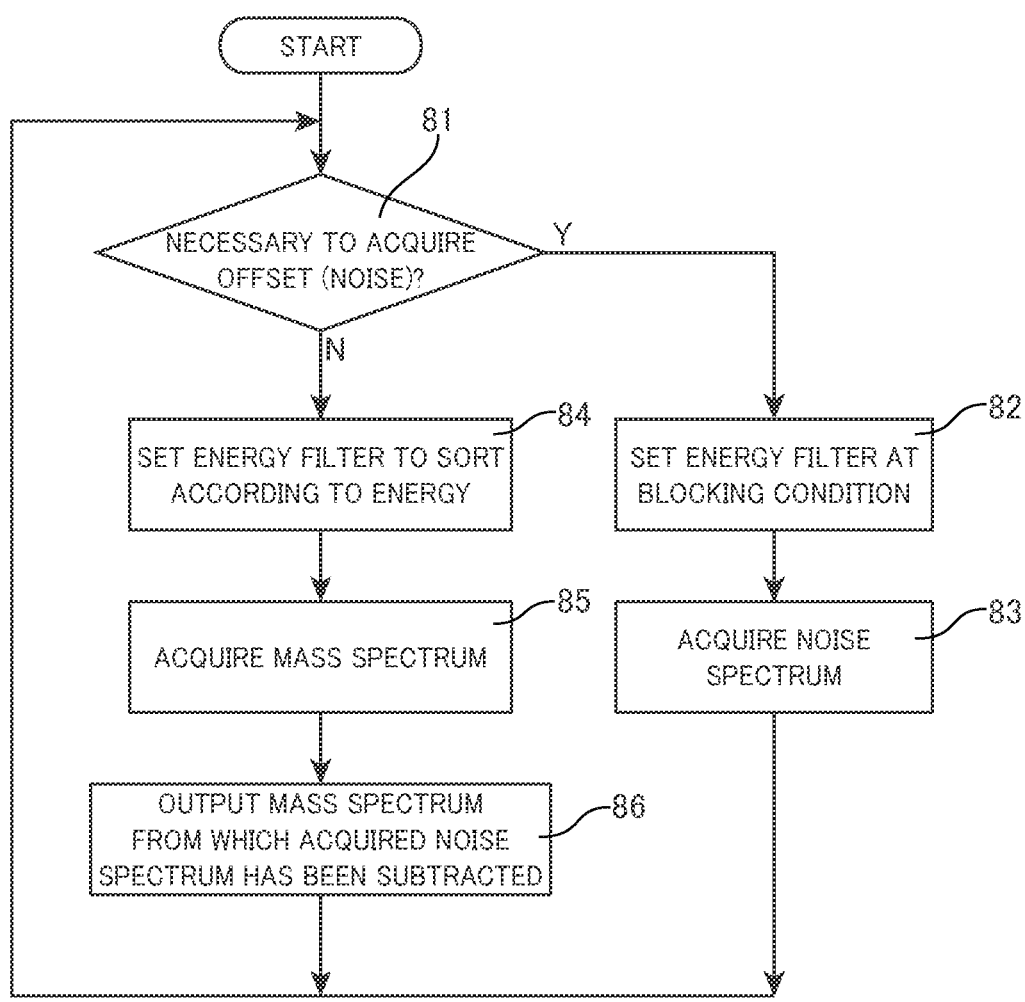
FIG. 5 is a flowchart depicting an overview of a control method of the gas analyzing apparatus.

FIG. 5 depicts an overview of a control method in the gas analyzing apparatus 1 for processing that outputs measurement results in which the offset (noise) has been canceled. In step 81, it is determined whether the first controller module 51 has acquired the first detection data 71 relating to the offset (noise). The gas analyzing apparatus 1 generates the ion flow 17 fundamentally continuously and can analyze the ion flow 17 continuously or intermittently with short-term repetitions that are averaged. Accordingly, it is possible to repeatedly perform measurement with the ion flow 17 blocked (shielded) and measurement with the ion flow 17 released (not blocked) under substantially the same conditions. To give priority to accuracy, the first detection data 71 relating to the offset may be acquired every time the second detection data 72 relating to a mass spectrum is obtained, or when giving priority to the time required by measurement, the first detection data 71 may be acquired at limited timing, such as periodically at intervals of a predetermined number of measurements, or when a certain time has elapsed, or when the measurement conditions have changed or when the gas analyzing apparatus 1 has started up.

When acquiring the first detection data 71, in step 82, the energy filter 28 is set at conditions where the energy filter 28 functions as the blocking device 29, and in step 83, the first detection data 71 is acquired by the analyzer 20 in a state where passage of the ion flow 17 is blocked by the energy filter 28. When acquiring the second detection data 72 relating to a mass spectrum including an offset and not the first detection data 71 relating to the offset (noise), in step 84 the second controller module 52 sets the energy filter 28 at predetermined conditions to sort (pass, flow) the ion flow 17 according to energy, and in step 85 the second detection data 72 relating to the mass spectrum is acquired by the analyzer 20 in a state where the ion flow 17 is not blocked. In addition, in step 86, the third controller module 53 outputs, as the detection result 73, a mass spectrum obtained by subtracting the first detection data 71 relating to the offset from the second detection data 72 which has been obtained including the offset.

In the gas analyzing apparatus 1, the influence of the light emitted by the plasma 19 is suppressed by the first ion path 41 that guides the ion flow 17 on a bent path, so that the peaks in the mass spectrum 78 included in the second detection data 72 are sharp and the offset is also small. Accordingly, through what is essentially simple subtraction of a limited amount of background information included in the first detection data 71 obtained by blocking the ion flow 17, it is possible to obtain a sharper mass spectrum with a smaller offset without performing complex processing.

Figure 6:
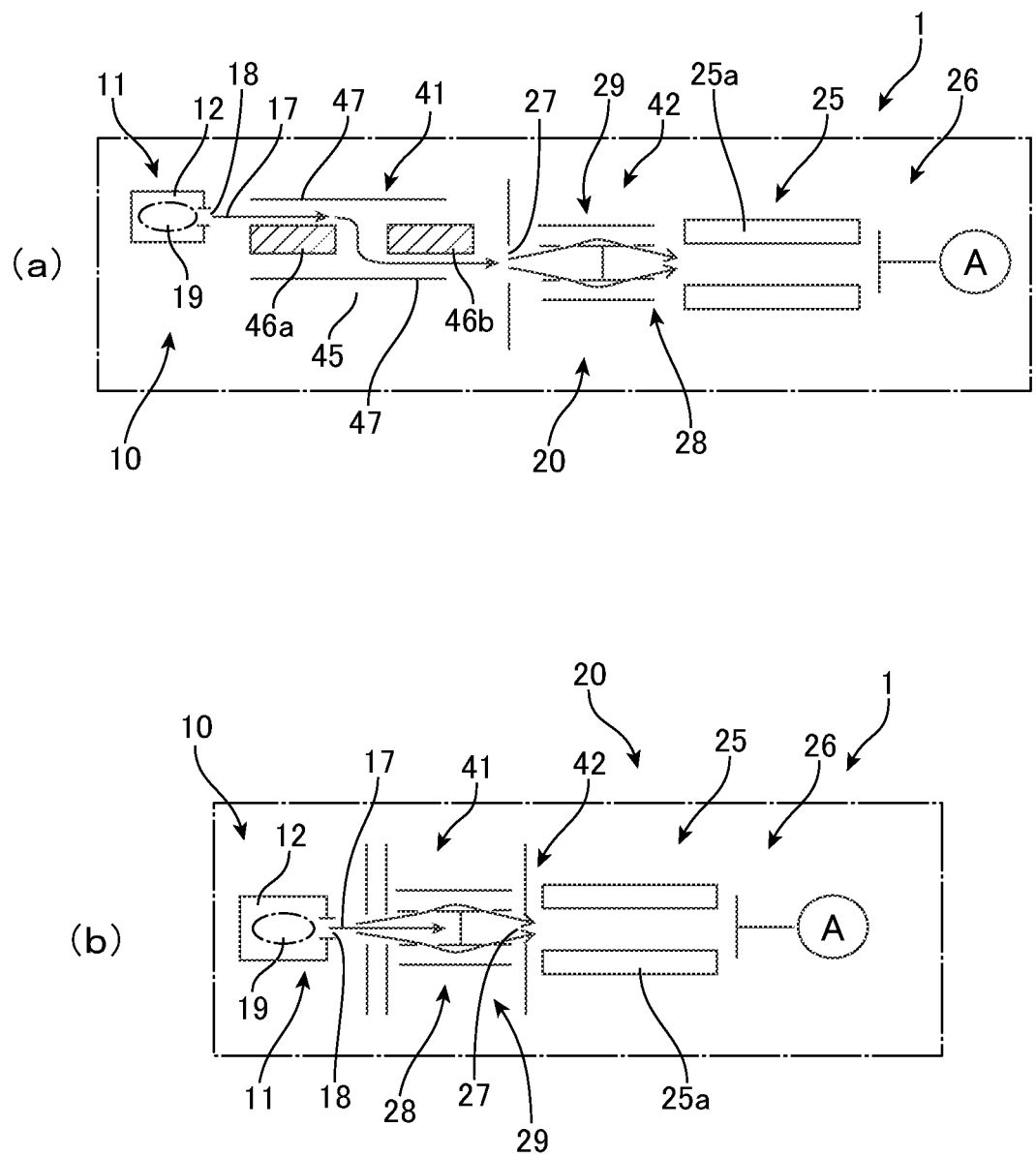
FIG. 6 is a diagram depicting the overall configuration of another example of a gas analyzing apparatus.

Different examples of the gas analyzing apparatus 1 are depicted in FIG. 6. The gas analyzing apparatus 1 depicted in FIG. 6(a) is an example configuration that uses an ion guide apparatus (guide unit) 45 that controls the path (first ion path) 41 of the ion flow 17 in place of an electrostatic lens group. The guide unit 45 includes an electrode 47, which is cylindrical for example and forms the periphery of the ion path 41, and deflection electrodes 46a and 46b disposed inside the electrode 47. If the ions to be guided are positively charged, the cylindrical surrounding electrode 47 is maintained at a positive potential, for example, around 100V, and the deflection electrodes 46a and 46b are maintained at ground potential, for example, 0V. The direction of the ion flow 17 is controlled along the electric field formed by these electrodes, so that the ion flow 17 is shifted up and down in the drawing and non-linearly bent twice so as to be guided to the opening 27 of the analyzer 20. Accordingly, the ion flow 17 from the chamber outlet 18 of the plasma generator 11, which is the ionization device 10, can be guided non-linearly to the opening 27 that is the inlet of the analyzer 20, thereby suppressing the influence of the plasma light that travels in a straight line.

In the gas analyzing apparatus 1 depicted in FIG. 6(b), the energy filter 28 disposed on the first ion path 41 is an apparatus provided so as to function as a device that forms an electric field that non-linearly guides the ion flow 17 from the chamber outlet 18 of the plasma generator 11, which is the ionization device 10, and also as the blocking device 29 that blocks the ion flow 17. As described earlier, the Bessel box-type energy filter 28 is composed of a cylindrical electrode, a disc-shaped electrode disposed in the center of the cylindrical electrode, and electrodes disposed at both ends of the cylindrical electrode, with the ion flow 17 being guided non-linearly to avoid the disc-shaped electrode disposed in the center of the cylindrical electrode. Typically, the ion flow 17 passes through the energy filter 28 on a bent path from the inlet to the outlet of the energy filter 28 so as to pass around the periphery of the disc-shaped electrode. This means that the disc-shaped electrode disposed at the center of the cylindrical electrode is capable of preventing soft X-rays generated during plasma generation and light generated during gas ionization from directly entering the detector 26. Accordingly, even with the gas analyzing apparatus 1 with the configurations described above, the influence of the light generated in the plasma generator 11 can be suppressed by non-linearly guiding the ion flow 17. In addition, by measuring the offset (noise) while blocking the ion flow 17, it is possible to efficiently remove any remaining noise components and output a more accurate mass spectrum as the detection result.

Note that although an example where a quadrupole-type is used as the mass filter 25 of the gas analyzing unit 20 has been described above, it is also possible for the mass filter 25 to be another type, such as an ion trap or a Wien filter.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. A control method for a gas analyzing apparatus, wherein the gas analyzing apparatus includes:
an ionization device configured to generate an ion flow of a sample gas;
an analyzer configured to continuously or intermittently analyze the ion flow supplied from the ionization device;
a first ion path configured to non-linearly guide the ion flow from an output of the ionization device to an inlet of the analyzer to provide a light shielding property; and
a blocking device configured to intermittently block and release, using an electric field or a magnetic field, the ion flow on at least part of a path of the ion flow configured to flow through the first ion path to a mass filter of the analyzer,
and the method comprises:
acquiring first detection data including mass-to-charge ratios to be detected using the mass filter of the analyzer in a state where passage of the ion flow is blocked by the blocking device;
acquiring second detection data including mass-to-charge ratios to be detected using the mass filter of the analyzer in a state where the passage of the ion flow has been released by the blocking device; and
outputting a detection result including a difference between the second detection data and the first detection data.

2. The method according to claim 1,
wherein the first detection data and second detection data include spectrum data.

3. A gas analyzing apparatus comprising:
an ionization device configured to generate an ion flow of a sample gas;
an analyzer configured to continuously or intermittently analyze the ion flow supplied from the ionization device;
a first ion path configured to non-linearly guide the ion flow from an output of the ionization device to an inlet of the analyzer to provide a light shielding property;
a blocking device configured to intermittently block and release, using an electric field or a magnetic field, the ion flow on at least part of a path of the ion flow that flows through the first ion path to a mass filter of the analyzer; and
a control device configured to control the gas analyzing apparatus,
wherein the control device includes:
a first controller configured to acquire first detection data including mass-to-charge ratios to be detected using the analyzer in a state where passage of the ion flow is blocked by the blocking device;
a second controller configured to acquire second detection data including mass-to-charge ratios to be detected using the analyzer in a state where passage of the ion flow has been released by the blocking device; and
a third controller configured to output a detection result including a difference between the second detection data and the first detection data.

4. The gas analyzing apparatus according to claim 3,
wherein the ionization device includes a device that plasma-ionizes the sample gas.

5. The gas analyzing apparatus according to claim 4,
wherein the ionization device includes:
a sample chamber configured to be depressurized, includes a dielectric wall structure, and into which the sample gas flows from a process to be monitored;
a high-frequency supplying device configured to generate plasma inside the sample chamber using at least one of an electric field and a magnetic field applied through the dielectric wall structure; and
a plasma controller configured to control a frequency and power of the high frequency supplied from the high frequency supplying device,
wherein the first ion path includes a path connecting an outlet of the sample chamber and the inlet of the analyzer.

6. The gas analyzing apparatus according to claim 5,
wherein the plasma controller includes a function of changing the frequency of the high frequency supplied by the high frequency supplying device to ignite plasma inside the sample chamber.

7. The gas analyzing apparatus according to claim 3,
wherein the blocking device includes one of a blocking potential generator and an energy filter.

8. A non-transitory computer-readable medium storing a computer program that controls the gas analyzing apparatus,
wherein the gas analyzing apparatus includes:
an ionization device configured to generate an ion flow of a sample gas;
an analyzer configured to continuously or intermittently analyze the ion flow supplied from the ionization device;
a first ion path configured to non-linearly guide the ion flow from an output of the ionization device to an inlet of the analyzer to provide a light shielding property; and
a blocking device configured to intermittently block and release, using an electric field or a magnetic field, the ion flow on at least part of a path of the ion flow configured to flow through the first ion path to a mass filter of the analyzer,
the computer program comprising instructions that execute:
acquiring first detection data including mass-to-charge ratios to be detected using the mass filter of the analyzer in a state where passage of the ion flow is blocked by the blocking device;

acquiring second detection data including mass-to-charge ratios to be detected using the mass filter of the analyzer in a state where passage of the ion flow has been released by the blocking device; and outputting a detection result including a difference between the second detection data and the first detection data.

9. The method according to claim 1, wherein the blocking device includes an energy filter configured to non-linearly guide the ion flow, wherein
the acquiring first detection data includes setting a potential of the energy filter to block passing ions of all energies, and
the acquiring second detection data includes setting the potential of the energy filter to pass ions according to an energy.

10. The gas analyzing system according to claim 3, wherein the blocking device includes an energy filter configured to non-linearly guide the ion flow, wherein
the first function includes setting a potential of the energy filter to block passing ions of all energies, and
the second function includes setting the potential of the energy filter to pass ions according to an energy.

11. The non-transitory computer-readable medium storing the computer program according to claim 8, wherein the blocking device includes an energy filter configured to non-linearly guide the ion flow, wherein
the acquiring first detection data includes setting a potential of the energy filter to block passing ions of all energies, and
the acquiring second detection data includes setting the potential of the energy filter to pass ions according to an energy.

* * * * *